United States Patent
Schmidt

(10) Patent No.: US 7,505,586 B2
(45) Date of Patent: Mar. 17, 2009

(54) METHOD FOR COMPUTER-BASED ENCRYPTION AND DECRYPTION OF DATA

(75) Inventor: Herbert Schmidt, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 1060 days.

(21) Appl. No.: 10/324,118

(22) Filed: Dec. 20, 2002

(65) Prior Publication Data

US 2003/0138099 A1  Jul. 24, 2003

(30) Foreign Application Priority Data

Dec. 20, 2001  (DE) ................... 101 62 991

(51) Int. Cl.
*H04K 1/00* (2006.01)
*H04L 9/32* (2006.01)

(52) U.S. Cl. ......................... 380/28; 713/189

(58) Field of Classification Search ............ 380/28–29, 380/277; 713/189
See application file for complete search history.

(56) References Cited

U.S. PATENT DOCUMENTS

| | | | | |
|---|---|---|---|---|
| 5,038,376 A | * | 8/1991 | Mittenthal | 380/37 |
| 5,619,576 A | * | 4/1997 | Shaw | 380/44 |
| 5,929,792 A | * | 7/1999 | Herriot | 341/55 |
| 6,735,310 B1 | * | 5/2004 | Hsing et al. | 380/28 |
| 7,006,629 B2 | * | 2/2006 | Murray | 380/43 |
| 2002/0095604 A1 | * | 7/2002 | Hausler | 713/201 |
| 2006/0088158 A1 | * | 4/2006 | Murray | 380/43 |

FOREIGN PATENT DOCUMENTS

WO  01/74005  10/2001

* cited by examiner

*Primary Examiner*—Hosuk Song
(74) *Attorney, Agent, or Firm*—Staas & Halsey LLP

(57) ABSTRACT

For encrypting a string of data elements from a first value range, a respective data element is combined with a key element by a first computing operation. The resulting combination result may lie outside the first value range. From the combination result, an encrypted data element is then derived by a second computing operation that maps onto a second value range, for example printable 1-byte characters. Decryption is accomplished by combining the encrypted data element with the key element using an inverse computing operation to the second computing operation executed iteratively until a result of an iteration step lies within the first value range.

12 Claims, 2 Drawing Sheets

METHOD FOR COMPUTER-BASED ENCRYPTION AND DECRYPTION OF DATA

CROSS REFERENCE TO RELATED APPLICATIONS

This application is based on and hereby claims priority to German Application No. 101 62 991.5 filed on Dec. 20, 2001, the contents of which are hereby incorporated by reference.

BACKGROUND OF THE INVENTION

In modern communications and data processing systems, methods for the reliable encryption and decryption of data are becoming increasingly important. Encryption is usually performed with the aid of key data, also referred to in the following text as key for short, with the aim of preventing as reliably as possible a decryption without knowledge of the key.

One known and very secure method of data encryption is based on using pairs of keys, including a public key and a private key in each pair. The private and public keys are related to each other in such a way that data encrypted with the public key can be decrypted again solely using the associated private key. It is therefore possible to transmit a document in encrypted form from a sender to a recipient, after the sender obtains the public key of the recipient, the document is encrypted with the public key and is transmitted in encrypted form to the recipient. The recipient can then decrypt the encrypted document using his private key, and only using the private key. A public transmission of the public key does not jeopardize the security of the transmission since, provided the key is long enough, it is virtually impossible to derive the private key from the public key.

Owing to its complex mathematical structure, however, performance of an encryption method based on public and private keys is very computer-intensive and requires considerable computing capacities, especially given the high data transmission rates common today.

In addition, the calculation of private and public keys also requires a comparatively large amount of computing power, which consequently makes a change or a dynamic assignment of keys much more difficult.

SUMMARY OF THE INVENTION

An object of the present invention is to disclose a less intensive method for computer-based encryption and decryption of a string of data elements which permits a flexible key specification.

With the method according to the invention, the encryption and decryption of a string of data elements is executed in each case by a computer device such as a personal computer or a microprocessor for example. A data element to be encrypted can be here, for example, a binary coded character, a character group, a number, or another data object. The data elements to be encrypted belong to a specifiable first value range. The latter can be limited to a specifiable selection of characters, such as printable characters, alphanumeric characters, pure text characters, digits or special characters from an ASCII character set, where ASCII stands for American Standard Code for Information Interchange, or a Unicode character set, for example.

The encryption and decryption is performed using one or more key elements, which may be binary coded characters, character groups or numbers, for example. For encryption, a respective data element to be encrypted is combined with a key element by a first computing operation. The resulting combination result may lie outside the first value range. From the resulting combination result, an encrypted data element is then derived by a second computing operation that maps onto a second value range. The second value range may be limited to, for example, characters that can be represented by a single byte, printable characters, or characters that require no special handling by an application program in the case of further processing or further transmission. The second computing operation may preferably include a "modulo" operation, by which any integer is mapped onto an ASCII character for example.

For decrypting an encrypted data element, the latter is combined with the key element, wherein an inverse computing operation to the second computing operation is executed iteratively until a result of an iteration step lies within the first value range. Since the number of iterations to be performed can differ, and in particular is not known in advance, a decryption without the knowledge of the key element is made much more difficult at least.

A method according to the invention permits a simple, fast and efficient encryption and decryption of data elements. The computing operations to be executed can generally be realized by a few processor operations in the form of logical or arithmetic register combinatorial operations. A method according to the invention is thus particularly suited to a hardware implementation. Moreover, no intensive calculation of the key elements is required, so that a flexible key specification or key change is possible. In addition, a method according to the invention can be adapted in a very simple way to system specifications with respect to a value range of the data elements to be encrypted and with respect to a value range of the encrypted data elements. Such adaptation is, as it were, a part of the encryption method according to the invention. It is thus readily possible to limit the second value range by a corresponding design of the second computing operation to the particular characters that are permitted to be transmitted in the text part of an e-mail for example. It is thus possible to dispense with an additional recoding of the e-mail, for example in accordance with the "Base 64 code".

According to a particularly simple embodiment, successive data elements can be encrypted successively and element-by-element with key elements of a specified string of key elements. Such a string of key elements is also referred to in the following text as "key", "keyword" or "key text".

It is furthermore possible to repeat periodically the specified string of key elements for the encryption of longer data element strings. It is consequently possible in a very simple way to use keys having a different key length, depending on the level of security required. For instance, a 128-bit encryption can be achieved with a 27-character long key text. A key change or a dynamic assignment of keys is also possible without additional outlay.

According to a further advantageous embodiment of the invention, in each case the position of the respective data element within the string of data elements, or the position of the key element within a string of key elements, or both, can be included in the combinatorial operations of the unencrypted and of the encrypted data element with the key element. The inclusion of such a position parameter renders an unauthorized decryption even more difficult.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
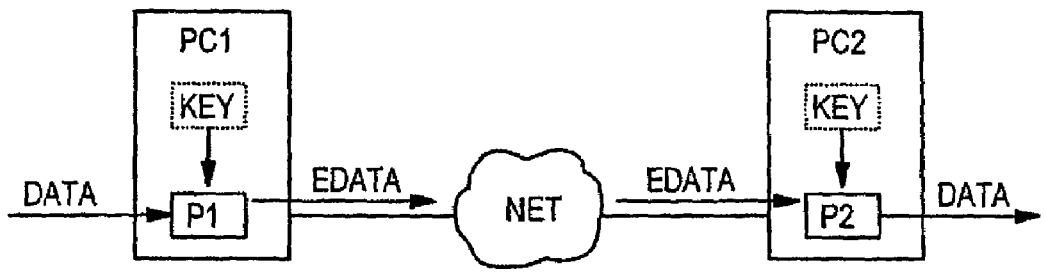
FIG. 1 is a block diagram of a communication system having two personal computers during the encrypted transmission of data.

Reference will now be made in detail to the preferred embodiments of the present invention, examples of which are illustrated in the accompanying drawings, wherein like reference numerals refer to like elements throughout.

FIG. 1 is a block diagram of a communication system having two personal computers PC1 and PC2 connected by a network NET. The personal computer PC1 has a central processor P1 and the personal computer PC2 has a central processor P2.

In the present exemplary embodiment, an unencrypted character string DATA is to be encrypted by the personal computer PC1, transmitted in encrypted form over the network NET to the personal computer PC2, and decrypted again by the latter. The character string DATA to be encrypted includes here a string of ASCII characters as data elements, wherein an ASCII character is understood to be a character that can be coded using a 1-byte ASCII numeric value.

The individual characters of the character string DATA are limited to a first value range having a lower limit L1 and an upper limit U1. In the present exemplary embodiment, the character string DATA includes "printable" ASCII characters having an ASCII numeric value between 32 and 126. The lower limit L1 of the first value range thus has the ASCII numeric value 32 and its upper limit U1 has the ASCII numeric value 126. As an alternative, it is also possible to specify any other character range, also one having a plurality of non-contiguous intervals, as the first value range. Thus a character range formed as required for 2-byte Unicode characters can also be specified as the first value range for example.

The character string DATA to be encrypted is encrypted by the central processor P1 of the personal computer PC1 with the aid of a key Key. The same key KEY is stored both in the personal computer PC1 and in the personal computer PC2, and is used both for encryption and for decryption. This is therefore a "symmetrical" encryption method.

In the present exemplary embodiment the key KEY includes a string of printable ASCII characters as key elements. It should however be noted that this restriction is not mandatory, but simply facilitates input of a key text using commercially available keyboards. In actual fact, any characters or numbers that can be processed by the central processor P1 can be used as key elements.

With the aid of the key KEY, the unencrypted character string DATA is converted by the central processor P1 into an encrypted character string EDATA, which is transmitted over the network NET to the personal computer PC2, to be decrypted again there by the central processor P2 with the aid of the key KEY stored there. The individual characters of the encrypted character string EDATA are limited to a second value range having a lower limit L2 and an upper limit U2. In the present exemplary embodiment, the encrypted character string EDATA includes ASCII characters which have no control function, and which can therefore be transmitted over the network NET without special handling, e.g. in the text part of an e-mail. ASCII characters have an ASCII numeric value between 32 and 255. The lower limit L2 of the second value range thus has the ASCII numeric value 32 and its upper limit U2 has the ASCII numeric value 255.

Apart from the encrypted transmission of data, a method according to the invention can of course also be used for the encrypted storage of data on a mass storage medium. For example, passwords can be encrypted by a method according to the invention before being stored, thus protected, in a password file.

Figure 2:
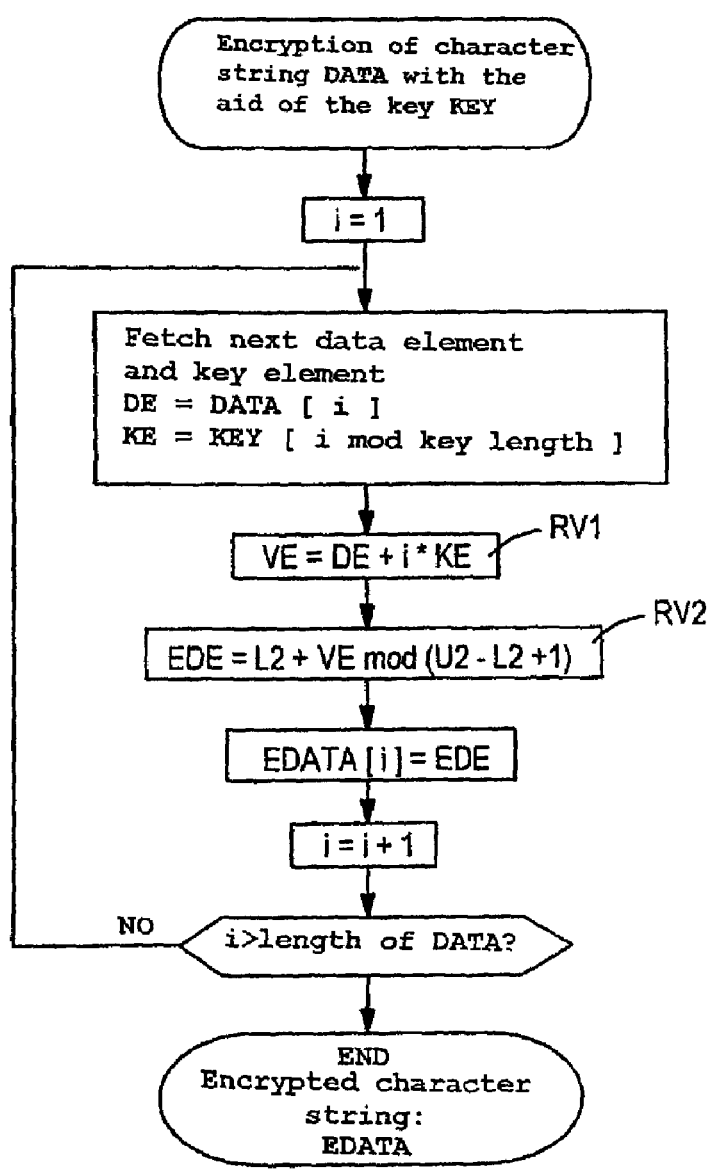
FIG. 2 is a flowchart for illustrating the procedure during the encryption of data.

FIG. 2 is a flowchart of a method to be executed by the personal computer PC1 for encrypting the character string DATA with the aid of the key KEY. At the start of encryption, a control variable i, which indicates the position of a current character to be encrypted within the character string DATA, is set to the value 1. This initializes a loop, in which iteration is performed over the individual characters of the character string DATA. Within the loop, first of all the next as yet unprocessed data element, i.e. the i-th character DE=DATA(i) of the character string DATA, as well as the next key element KE=KEY (i mod key length) to be processed of the key KEY is read in. Like all characters of the character string DATA, the character DE lies here within the first value range, i.e. $L1 \leq DE \leq U1$ applies. The square brackets in the flowchart (parentheses in the preceding description) indicate—as is common in many programming languages—an indexing of a data field. 'mod' refers to the mathematical modulo function. By the modulo formation with the key length in the index for the key KEY, it is ensured that the index of KEY does not exceed the key length even in the case of larger values of the control variable i. This in fact corresponds to a periodic repetition of the key over the entire length of the character string DATA.

The character DE is combined with the key elements KE and the control variable i by a first computing operation RV1 of the central processor P1 to form a combination result VE in accordance with the computing rule VE=DE+i*KE. The calculation is performed here with the ASCII numeric values of the character DE and of the key element KE. Owing in particular to the multiplication by the control variable i, the combination result VE will usually no longer lie within the first value range or within a value range that can be represented by 1 byte. The combination result VE should thus preferably be represented by an integer stored in a plurality of bytes.

Following the first computing operation RV1, the combination result VE is mapped by a second computing operation RV2 to be performed by the central processor P2 onto the second value range (between L2=32 and U2=255). An encrypted character EDE in accordance with the computing rule EDE=L2+VE mod (U2−L2+1) is obtained as a result of the second computing operation RV2. The encrypted character EDE obviously lies within the second value range and $L2 \leq EDE \leq U2$ applies. Owing to the modulo function, the second computing operation RV2 maps all possible values for the combination result VE, i.e. its entire definition range, onto the second value range. In turn, the second value range permits a 1-byte representation.

If the second value range does not form a contiguous interval, i.e. if m special characters within the interval do not belong to the second value range, the computing operation RV2 can be replaced by the computing rule EDE=L2+VE mod (U2−L2+1−m) with a subsequent mapping of the m special characters from the interval (L2, U2−m) onto the interval (U2−m+1, U2). Such special characters may be, for example, inverted commas or comment characters that, without mapping onto the second value range, could trigger misinterpretations during any subsequent processing.

After calculation of the encrypted character EDE, the latter is inserted as the i-th character into the encrypted character string EDATA: EDATA(i)=EDE. Following this the control variable i is incremented and it is then checked whether i is greater than the length of the character string DATA. If not, a branch is made back to the start of the loop to read in the next data element and the next key element. Otherwise the encryption of the character string DATA into the encrypted character string EDATA is complete.

Figure 3:
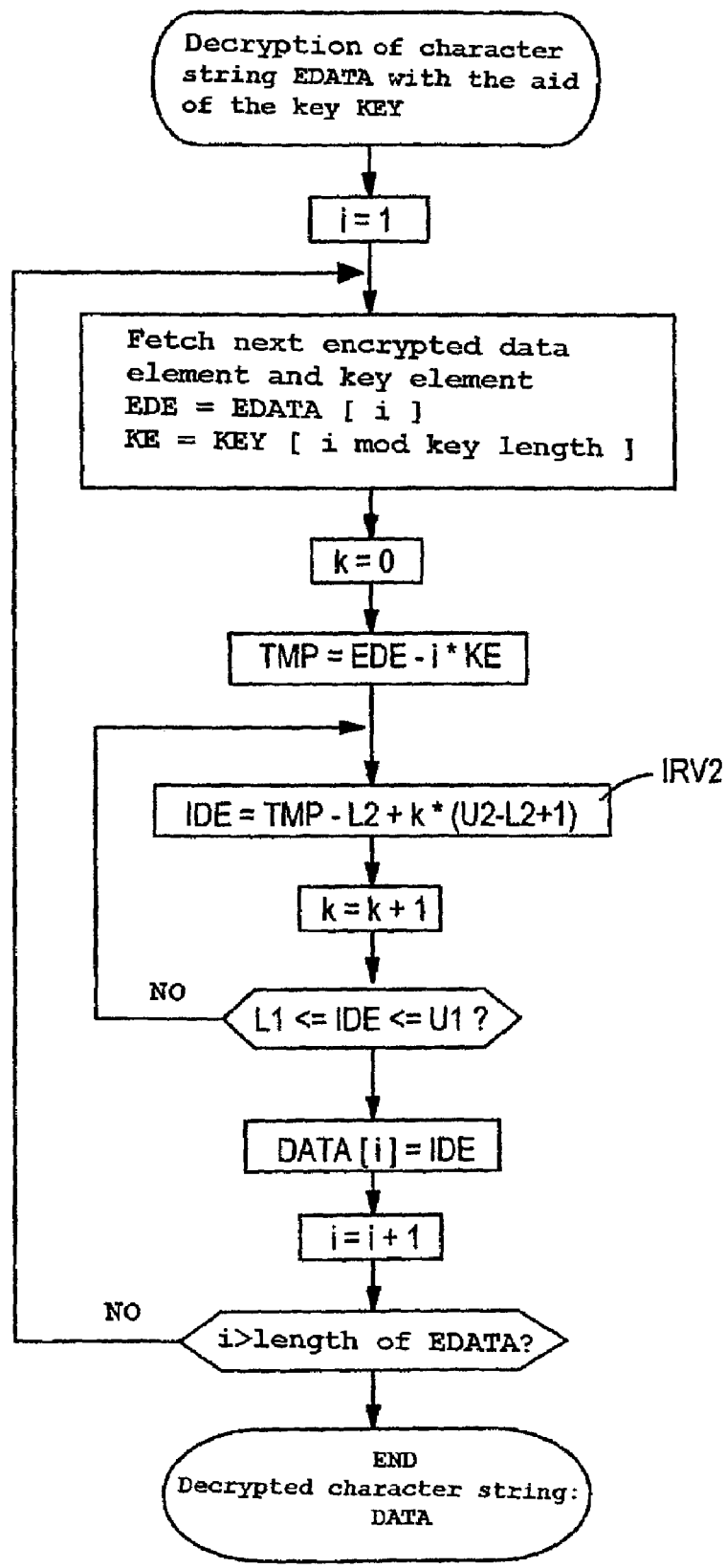
FIG. 3 is a flowchart for illustrating the procedure during the decryption of data.

FIG. 3 is a flowchart of the procedure during decryption of the encrypted character string EDATA with the aid of the key KEY. At the start of decryption, the control variable i, which indicates the position of a current character to be decrypted within the character strings EDATA, is initialized with the start value 1. A loop then begins in which the encrypted character string EDATA is cycled through character by character. Within the loop, first of all the next data element to be decrypted, i.e. the i-th character EDE=EDATA(i) of the encrypted character string EDATA, as well as the next key element KE=KEY (i mod key length) to be processed are read in. The character EDE to be encrypted lies within the second value range and $L2 \leq EDE \leq U2$ applies. The modulo formation with the key length in the index for the key KEY ensures that the index value does not exceed the key length. This in fact corresponds to a periodic repetition of the key over the entire length of the encrypted character string EDATA.

After reading in the respective data element EDE and key element KE, a variable k is initialized with the value 0 as control variable for a subsequent iteration. In addition, the character EDE to be decrypted is combined with the key element KE to form an interim result TMP in accordance with TMP=EDE−i*KE. In particular owing to the multiplication by the control variable i, the interim result TMP usually lies neither in the first nor in the second value range and should therefore be represented by an integer stored in a plurality of bytes.

For the further decryption of the character EDE, an iteration loop is then executed with the control variable k as iteration variable. Within the iteration loop, an inverse computing operation IRV2 to the second computing operation RV2 is executed as an iteration step. By the computing operation IRV2, the interim result TMP and the iteration variable k are combined to form an iteration step result IDE in accordance with IDE=TMP−L2+k*(U2−L2+1). Like TMP, IDE should be represented here as an integer stored in a plurality of bytes.

If the second value range does not form a contiguous interval, and a mapping of m special characters onto the interval end was performed during encryption, the special characters in EDE can be mapped back from the interval (U2−m+1U2) into the interval (L2, U2−m) again before calculation of the interim result TMP. In this case the computing operation IRV2 should be replaced by the computing rule IDE=TMP−L2+k*(U2−L2+1−m).

Following execution of the computing operation IRV2, the iteration variable k is incremented. It is then checked whether the respective result IDE of the iteration step lies within the first value range; i.e. it is checked whether $L1 \leq IDE \leq U1$. For as long as this does not apply, a branch is made back to the start of the iteration loop to execute the computing operation IRV2 once more. If, on the other hand, it is found that the result IDE of the respective iteration step lies within the first value range, then the iteration is terminated.

As can be readily illustrated, the first iteration step result IDE that lies within the first value range is exactly the original unencrypted character.

For proof, let us first of all examine the overall expression resulting from the computing operations RV1 and RV2 for the encrypted character EDE=L2+(DE+i*KE) mod (U2−L2+1). If this expression is inserted into the resulting expression for the iteration interim result IDE, the following is obtained after reducing L2:IDE=(DE+i*KE)mod(U2−L2+1)−i*KE+k*(U2−L2+1). According to the general mathematical definition of the modulo combinatorial operation (a mod n), an integer j having the property: a mod n=a−j*n always exists for all integral a, n in each case. The following is therefore obtained: IDE=(DE+i*KE)−j*(U2−L2+1)−i*KE+k*(U2−L2+1). With the selection k=j (in the iteration k can assume all integral values), the following is finally obtained after reducing i*KE:IDE=DE; i.e. the iteration result IDE is the same as the unencrypted character DE. Following termination of the iteration, the variable IDE thus contains exactly the decrypted character of the original character string DATA.

As already mentioned above, the respective number of iterations until the termination criterion is fulfilled is not constant, but variable. In particular, the number of iterations cannot be derived without knowledge of the key, with the result that an unauthorized decryption is made much more difficult.

Following termination of the iteration loop, finally the result IDE of the last iteration step is assigned to the i-th character of the character string DATA in accordance with DATA(i)=IDE. The control variable i is then incremented and compared with the length of the character string EDATA. As long as the control variable i is still less than or equal to the length of the character string EDATA, a branch is made back to the start of the loop to read in the next encrypted data element and the next key element. Otherwise the decryption of the character string EDATA into the decrypted character string DATA is complete.

The invention has been described in detail with particular reference to preferred embodiments thereof and examples, but it will be understood that variations and modifications can be effected within the spirit and scope of the invention.

What is claimed is:

1. A method for computer-based encryption and decryption of a string of data elements, each within a first value range, comprising:

encrypting a respective data element by combining with a key element in a first computing operation to produce a resulting combination result, and deriving an encrypted data element by a second computing operation that maps the resulting combination result onto a specified second value range; and decrypting the encrypted data element by combining with the key element in an inverse computing operation to the second computing operation iteratively executed until a result of an iteration step lies within the first value range.

2. The method as claimed in claim 1, wherein said encrypting encrypts data elements successively and element-by-element with successive key elements of a specified string of key elements.

3. The method as claimed in claim 2, wherein the specified string of key elements is repeated periodically for the encryption of data element strings longer than the specified string of key elements.

4. The method as claimed in claim 3, wherein the first value range is limited to data elements that represent printable characters.

5. The method as claimed in claim 4, wherein the second value range is limited to data elements that can be processed without special handling by a specified application program.

6. The method as claimed in claim 5, wherein the second value range is identical to the first value range.

7. The method as claimed in claim 6, wherein the combining of the key element with the respective data element and the encrypted data element in said encrypting and decrypting, respectively, uses at least one of a position of the respective data element within the string of data elements and a position of the key element within a string of key elements.

8. The method as claimed in claim 7, wherein the second computing operation includes a modulo operation.

9. The method as claimed in claim 1, wherein the combining of the key element with the respective data element and the encrypted data element in said encrypting and decrypting, respectively, uses at least one of a position of the respective data element within the string of data elements and a position of the key element within a string of key elements.

10. The method as claimed in claim 9, wherein the second computing operation includes a modulo operation.

11. A system for encryption and decryption of a string of data elements, each within a first value range, comprising:

a first computer to encrypt a respective data element by combining with a key element in a first computing operation to produce a resulting combination result, and deriving an encrypted data element by a second computing operation that maps the resulting combination result onto a specified second value range; and a second computer, coupled to said first computer, to decrypt the encrypted data element by combining with the key element in an inverse computing operation to the second computing operation iteratively executed until a result of an iteration step lies within the first value range.

12. At least one computer readable medium storing at least one program to control at least one processor to perform encryption and decryption of a string of data elements, each within a first value range in accordance with a method comprising:

encrypting a respective data element by combining with a key element in a first computing operation to produce a resulting combination result, and deriving an encrypted data element by a second computing operation that maps the resulting combination result onto a specified second value range; and decrypting the encrypted data element by combining with the key element in an inverse computing operation to the second computing operation iteratively executed until a result of an iteration step lies within the first value range.

* * * * *